(12) United States Patent
Cooper

(10) Patent No.: US 10,399,886 B2
(45) Date of Patent: Sep. 3, 2019

(54) FEEDSTOCK GEL AND METHOD OF MAKING GLASS-CERAMIC ARTICLES FROM THE FEEDSTOCK GEL

(71) Applicant: Owens-Brockway Glass Container Inc., Perrysburg, OH (US)

(72) Inventor: Scott P Cooper, Maumee, OH (US)

(73) Assignee: Owens-Brockway Glass Container Inc., Perrysburg, OH (US)

(*) Notice: Subject to any disclaimer, the term of this patent is extended or adjusted under 35 U.S.C. 154(b) by 0 days.

(21) Appl. No.: 15/650,490

(22) Filed: Jul. 14, 2017

(65) Prior Publication Data

US 2019/0016622 A1   Jan. 17, 2019

(51) Int. Cl.

| | | |
|---|---|---|
| *C03C 10/00* | (2006.01) | |
| *C03B 32/02* | (2006.01) | |
| *C03B 19/06* | (2006.01) | |
| *C04B 35/622* | (2006.01) | |

(Continued)

(52) U.S. Cl.
CPC ............ *C03B 32/02* (2013.01); *C03B 19/063* (2013.01); *C03C 1/006* (2013.01); *C03C 3/087* (2013.01); *C03C 10/0009* (2013.01); *C04B 35/62204* (2013.01); *C04B 2235/656* (2013.01)

(58) Field of Classification Search
CPC .... A61L 27/025; A61L 27/12; C03C 10/0009
See application file for complete search history.

(56) References Cited

U.S. PATENT DOCUMENTS

| | | |
|---|---|---|
| 4,574,063 A | 3/1986 | Scherer |
| 4,994,414 A | 2/1991 | Yamamoto et al. |
| 5,914,356 A | 6/1999 | Erbe |

(Continued)

FOREIGN PATENT DOCUMENTS

| | | |
|---|---|---|
| JP | 2000128514 A | 5/2000 |
| RU | 2004509 C1 | 12/1993 |
| WO | 2016160507 A1 | 10/2016 |

OTHER PUBLICATIONS

Gonzalez-Oliver et al. Influence of water content on the rates of crystal nucleation and growth in lithia-silica and soda-lime-silica glasses. J Mater Sci (1979) 14: 1159.*

(Continued)

*Primary Examiner* — Noah S Wiese

(57) ABSTRACT

A method of making a glass-ceramic article includes synthesizing a feedstock gel that includes a base oxide network comprising $Na_2O$, $CaO$, and $SiO_2$, in which a molar ratio of $Na_2O:CaO:SiO_2$ in the gel is 1:2:3, and then converting the feedstock gel into a glass-ceramic article such as a container or a partially-formed container. The conversion of the feedstock gel into a glass-ceramic container may be performed at a temperature that does not exceed 900° C. and may include the steps of pressing the feedstock gel into a compressed solid green-body, sintering the green-body into a solid monolithic body of a glass-ceramic material, deforming the solid monolithic glass-ceramic body into a glass-ceramic preform, and cooling the preform. A glass-ceramic article having a glass-ceramic material that has a molar ratio of $Na_2O:CaO:SiO_2$ that is 1:2:3 is also disclosed.

20 Claims, 5 Drawing Sheets

(51) Int. Cl.
*C03C 1/00* (2006.01)
*C03C 3/087* (2006.01)

(56) References Cited

U.S. PATENT DOCUMENTS

| | | | |
|---|---|---|---|
| 5,981,412 A * | 11/1999 | Hench | A61L 27/025 |
| | | | 106/35 |
| 7,141,520 B2 | 11/2006 | Zimmer et al. | |
| 7,332,452 B2 | 2/2008 | Ogawa et al. | |
| 7,569,105 B2 | 8/2009 | Lin et al. | |
| 8,664,132 B2 | 3/2014 | Shelestak | |
| 8,806,896 B2 | 8/2014 | Swiler et al. | |
| 2003/0147606 A1 | 8/2003 | Wang et al. | |
| 2004/0241238 A1 | 12/2004 | Sepulveda et al. | |
| 2005/0095303 A1 | 5/2005 | Krenitski et al. | |
| 2007/0179039 A1 | 8/2007 | El Khiati et al. | |
| 2008/0098771 A1 | 5/2008 | Giardino et al. | |
| 2009/0325778 A1 | 12/2009 | El Khiati et al. | |
| 2010/0179662 A1 * | 7/2010 | Verne | A61F 2/30767 |
| | | | 623/20.32 |
| 2011/0163472 A1 | 7/2011 | Sepulveda et al. | |

OTHER PUBLICATIONS

Arstila et al. Factors affecting crystallization of bioactive glasses. Journal of the European Ceramic Society 27 (2007) 1543-1546.*
"A new sol-gel process for producing Na2O-Containing bioactive glass ceramics," Qi-Zhi Chen, et al., Acta Biomaterialia 6 (2010) 4143-4153.
"Gel Technology in Ceramics, Glass-Ceramics and Ceramic-Ceramic Composites," PH., Colomban, Ceramics International 15 (1989) 23-50.
"ZrO2-Transfomration-Toughened Glass-Ceramics Prepared by the Sol-Gel Process from Metal Alkoxides", M. Nogami and M. Tomozawa, J. Am. Ceram. Soc., 69 [2] 99-102 (1986).
Qi-Zhi Chen, "A new sol gel process for producing Na20-containing bioactive glass ceramics", Acta Biomaterialia, vol. 6, No. 10, Date: Oct. 1, 2010, pp. 4143-4153.
PCT Search Report and Written Opinion, Int. Serial No. PCT/US2018/040560, Int. Filing Date: Jul. 2, 2018, Applicant: Owens-Brockway Glass Container Inc., dated Oct. 15, 2018.

* cited by examiner

FEEDSTOCK GEL AND METHOD OF MAKING GLASS-CERAMIC ARTICLES FROM THE FEEDSTOCK GEL

The present disclosure is directed to glass-ceramic articles and methods of making glass-ceramic articles from a chemically synthesized feedstock gel.

BACKGROUND

Conventional soda-lime-silica glass is a rigid amorphous solid that is used extensively to manufacture a variety of hollow glass articles including containers such as bottles and jars. Soda-lime-silica glass comprises a disordered and spatially crosslinked ternary oxide network of $Na_2O$—CaO—$SiO_2$, in which the molar ratio of $Na_2O$:CaO:$SiO_2$ is approximately 1:1:6, and may also include other optional oxide and non-oxide materials, which may be referred to as secondary additives, that act as colorants, decolorants, redox agents, or other agents that affect the properties the final glass. Some examples of these optional oxide and non-oxide materials include $Al_2O_3$, MgO, $Li_2O$, $K_2O$, $Fe_2O_3$, $Cr_2O_3$, $MnO_2$, $Co_3O_4$, $TiO_2$, $SO_3$, and selenium. While the exact composition of the soda-lime-silica glass may be tailored to its particular end-use application by the inclusion of secondary additives, the $Na_2O$—CaO—$SiO_2$ ternary oxide network with its approximately 1:1:6 molar ratio is subject only to minor variances that fall usually within acceptable manufacturing tolerances.

Soda-lime-silica glass containers are typically produced by a melt processing procedure. Generally, during melt processing, a feedstock batch that includes virgin raw materials and optional recycled glass (i.e., cullet) is first melted in a continuous melting furnace at temperatures in excess of 1400° C. The resultant glass melt is homogenized and refined—usually downstream of the melting zone of the furnace—to achieve chemical and thermal consistency and to remove bubbles and inclusions. Glass containers are then fabricated from the homogenized and refined glass melt. For example, in a standard container-forming process, the glass melt is cooled in a forehearth channel to around 1150° C. and then distributed as individual gobs of molten glass to individual sections of an individual section forming machine by way of a gob delivery system. The glass gobs are formed into containers by a press-and-blow, a blow-and-blow, or some other shaping technique, typically at a temperature in excess of 900° C., followed by cooling of the containers to preserve their shape. The manufactured glass containers are then reheated and cooled at a controlled rate in an annealing lehr to remove internal stress points. Any of a variety of coatings may be applied to the surface of the glass container either before (hot-end coatings) or after (cold-end coatings) annealing.

The inclusion of $Na_2O$ and CaO in the chemistry of soda-lime-silica glass renders the commercial manufacture of glass containers more practical and less energy intensive while still yielding acceptable glass properties. The $Na_2O$ component functions as as a fluxing agent that reduces the melting, softening, and glass transition temperatures of the glass, as compared to pure silica glass, and the CaO component functions as a stabilizer that improves certain physical and chemical properties of the glass including its hardness and chemical resistance (especially with respect to water). Another oxide material, $Al_2O_3$, is commonly used in the glass container manufacturing industry to improve the chemical durability of the glass. But the use of $Na_2O$, CaO, and other oxide materials along with the primary network former, $SiO_2$, has to be balanced against the susceptibility to devitrification, or the spontaneous growth of crystals such as devitrite ($Na_2Ca_3Si_6O_{16}$) on the glass surface, since the dilution of $SiO_2$ with network modifiers confers mobility within the glass oxide network, thus making it easier for molecular network chains to rearrange themselves into crystal structures.

Devitrification is generally undesirable during the manufacture of soda-lime-silica glass containers because it reduces the transparency and mechanical strength of the glass. Devitrification may occur in soda-lime-silica glass when the glass is held in a viscous supercooled liquid state at a temperature between its glass transition and liquidus temperatures for too long. And, as previously noted, the inclusion of network modifiers in the soda-lime-silica glass chemistry, in particular CaO, increases the susceptibility of the glass to devitrification by increasing the liquidus temperature of the glass and enhancing network chain mobility. The 1:1:6 molar ratio of $Na_2O$:CaO:$SiO_2$ in soda-lime-silica glass strikes the appropriate balance between energy consumption, the physical and chemical properties of the glass, and the ability to cool the containers relatively quickly through a viscous supercooled liquid state to a temperature below the glass transition temperature while avoiding devitrification.

Glass-ceramics are a different class of materials than amorphous glasses such as conventional soda-lime-silica glass. Unlike soda-lime-silica glass, in which devitrification is purposefully avoided, glass ceramics are formed by crystallizing or ceramizing a parent glass in a controlled manner to form a crystalline phase distributed within an amorphous residual glass phase. More specifically, in standard practices, a parent glass having a chemistry tailored to glass-ceramic processing is formed, usually by melt processing, and then heat-treated in a multi-step procedure to induce bulk internal nucleation followed by crystal growth. The bulk nucleation stage of the heat-treatment procedure induces nuclei seed formation homogeneously throughout the bulk of the parent glass, and the subsequent crystal growth stage, which may be conducted at a higher temperature, grows crystals from and around those seeds. As such, the crystals in glass-ceramics are homogeneously distributed within the amorphous residual glass phase, as opposed to being formed and concentrated on the glass surface as a result of the spontaneous and unwanted nucleation that typifies devitrification.

A wide variety of parent glass chemistries that are conducive to glass-ceramic manufacture are known. Some fairly common parent glass compositions that have gained widespread applications are simple silicates such as the $Li_2O$—$SiO_2$ system and aluminosilicates such as the $Li_2O$—$Al_2O_3$—$SiO_2$, MgO—$Al_2O_3$—$SiO_2$, and ZnO—$Al_2O_3$—$SiO_2$ systems. These and other parent glass compositions usually include nucleation agents that promote bulk nucleation via the formation of nuclei seeds throughout the parent glass. Examples of suitable nucleation agents include metals such as gold, silver, platinum, palladium, and titanium, and nonmetals such as fluorides, $ZrO_2$, $TiO_2$, $P_2O_5$, $Cr_2O_3$, and $Fe_2O_3$. As a result of the formation of a crystalline phase comprised of well-distributed fine-grain crystals, glass-ceramics tend to have higher strength, toughness, chemical durability, and electrical resistance than their noncrystallized parent glass, and also exhibit a relatively low coefficient of thermal expansion, which provides them with excellent thermal shock resistance.

Due to their unique and customizable properties, glass-ceramics have found a wide variety of applications including aerospace and military products, cookware, satellite and telescope optics, dental restorations, and as bioactive materials. The glass container manufacturing industry may also benefit from identifying glass-ceramics that can meet its needs for various types of standard and specialty containers. It has been determined that a glass-ceramic based primarily on the same $Na_2O$—CaO—$SiO_2$ ternary oxide system as conventional soda-lime-silica glass-albeit one in which the chemistry is more conducive to controlled crystallization-could potentially be a welcome addition to the glass manufacturing art. Techniques for manufacturing such a glass-ceramic have also been identified that consume less energy than customary practices of glass-ceramic manufacturing in which a parent glass is first produced at relatively high temperatures through melt processing.

SUMMARY OF THE DISCLOSURE

The present disclosure describes a glass-ceramic article, such as a container or a partially-formed container, and a method of forming the article from a chemically-synthesized feedstock gel comprising a base oxide network that includes $Na_2O$, CaO, and $SiO_2$, with a molar ratio of $Na_2O:CaO:SiO_2$ in the gel being 1:2:3 (i.e., $Na_2O$-2CaO-3$SiO_2$). The glass-ceramic article is composed of a glass-ceramic material having an amorphous phase and a crystalline phase distributed within the amorphous phase, and the overall composition of the glass-ceramic material comprises the same $Na_2O$:CaO:$SiO_2$ molar ratio as its predecessor feedstock gel, although the amorphous residual glass and crystalline phases may differ from one another at least in terms of their chemical content. The feedstock gel may be synthesized at a low temperature from a liquid precursor medium that includes a reactive silicon-containing precursor compound such as sodium silicate or a polysiloxane. For example, the liquid precursor medium may be an aqueous silicate solution that includes sodium silicate, or it may be an acidic aqueous solution that includes an alkoxysilanol as produced by the hydrolytic polycondensation of a tetraalkoxysilane.

The "1:2:3" molar ratio of $Na_2O:CaO:SiO_2$ as used herein does not require strict adherence to a mathematically precise ratio of 1:2:3 but, rather, some fluctuation in the molar proportions of $Na_2O$, CaO, and $SiO_2$ is permitted so long as the 1:2:3 molar ratio is maintained when rounding to a single significant digit. To be sure, in many instances, the 1:2:3 molar ratio of $Na_2O:CaO:SiO_2$ is satisfied when the feedstock gel and the glass-ceramic material includes 15 mol % to 19 mol % $Na_2O$, 31 mol % to 35 mol % CaO, and 48 mol % to 52 mol % $SiO_2$, based on the total amount of $Na_2O$, CaO, $SiO_2$ only, such that other materials that may be present do not affect the individual mole percentages. Compared to conventional soda-lime-silica glass, the glass-ceramic material described in the present disclosure has appreciably more CaO and appreciably less $SiO_2$. The resulting crystal phase in the glass-ceramic material includes combeite, rather than devitrite, wollastonite, or silica, which are the typical crystal phases that result from crystalization of soda-lime-silica glass having an approximate 1:1:6 molar ratio of $Na_2O:CaO:SiO_2$. Compared to the typical crystal phases, combeite is more amenable to, and thus facilitates, bulk nucleation and crystal growth within the feedstock gel as the gel is converted into the glass-ceramic material and shaped.

The present disclosure embodies a number of aspects that can be implemented separately from or in combination with each other to synthesize the feedstock gel and ultimately convert the gel into a glass-ceramic article such as a container (e.g., a bottle, jar, jug), a partially-formed container (e.g., a parison), a bowl, plate or other tableware, or any other suitable glass-ceramic article. According to one aspect of the present disclosure, a method of making a glass-ceramic article includes synthesizing a feedstock gel that includes a base oxide network comprising $Na_2O$, CaO, and $SiO_2$, with a molar ratio of $Na_2O:CaO:SiO_2$ in the gel being 1:2:3. The feedstock gel is then pressed into a compressed solid green-body and sintered at a temperature below 900° C. to produce a solid monolithic body of a glass-ceramic material that has an amorphous phase and a crystalline phase distributed within the amorphous phase. The solid monolithic body of a glass-ceramic material has a density that is greater than a density of the feedstock gel. Next, the solid monolithic body of a glass-ceramic material is deformed into a glass-ceramic preform having a container shape. The glass-ceramic preform is then cooled into a glass-ceramic article in the form of a container or a partially-formed container.

According to another aspect of the present disclosure, a method of making a glass-ceramic article includes providing a liquid precursor medium that includes a reactive silicon-containing precursor compound. At least one soluble salt is added to the liquid precursor medium and a precipitate is formed that comprises $Na_2O$, CaO, and $SiO_2$ in which a molar ratio of $Na_2O:CaO:SiO_2$ is 1:2:3. The at least one soluble salt is a soluble sodium salt, a soluble calcium salt, or both a soluble sodium salt and a soluble calcium salt. Next, the precipitate is dried into a feedstock gel that has a molar ratio of $Na_2O:CaO:SiO_2$ in the gel that is the same as that of the precipitate (i.e., 1:2:3). The feedstock gel is then converted into a glass-ceramic article at a temperature that does not exceed 900° C.

According to yet another aspect of the present disclosure, a glass-ceramic container comprises a main body having a bottom wall, an upstanding side wall extending from a periphery of the bottom wall, and a neck portion extending from the side wall opposite the bottom wall. The neck portion defines an opening to an internal containment space defined by the main body. The hollow main body is comprised of a glass-ceramic material that has an amorphous residual glass phase and a crystalline phase distributed within the amorphous residual glass phase. The glass-ceramic material, moreover, has a molar ratio of $Na_2O:CaO:SiO_2$ that is 1:2:3. The glass-ceramic container may be formed from a feedstock gel by first sintering a compressed solid green-body of the feedstock gel and then deforming the resultant solid monolithic body of a glass-ceramic material into a container shape or, alternatively, the glass-ceramic container may be formed from the feedstock gel in some other manner.

BRIEF DESCRIPTION OF THE DRAWINGS

The disclosure, together with additional objects, features, advantages, and aspects thereof, will be best understood from the following description, the appended claims, and the accompanying drawings, in which:

DETAILED DESCRIPTION

Figure 2:
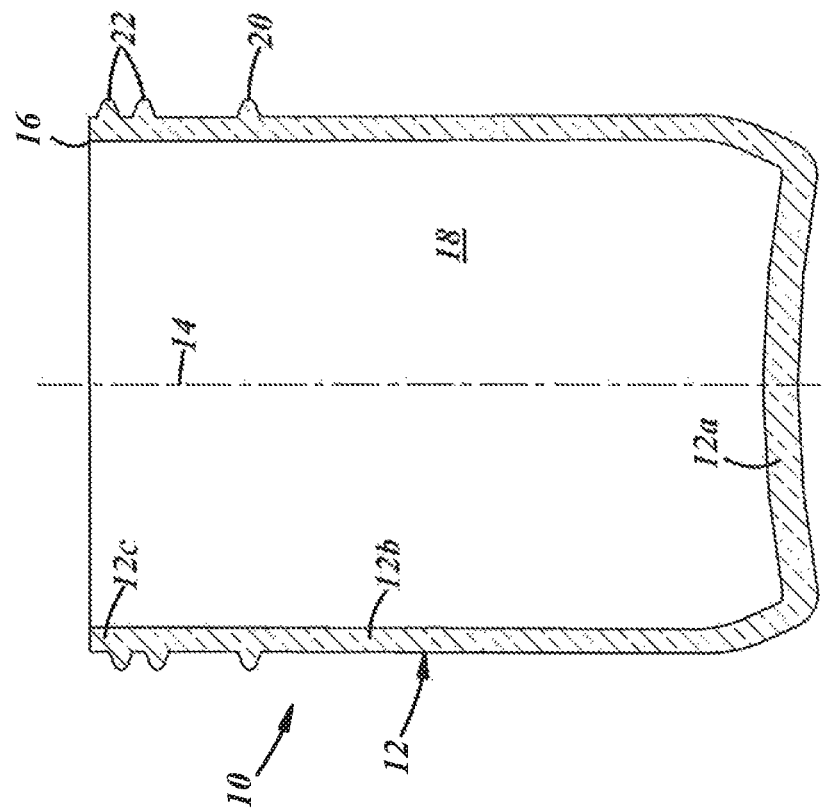
FIG. 2 is a cross-sectional view of the glass-ceramic container shown in FIG. 1 taken along section line 2-2.
Figure 1:
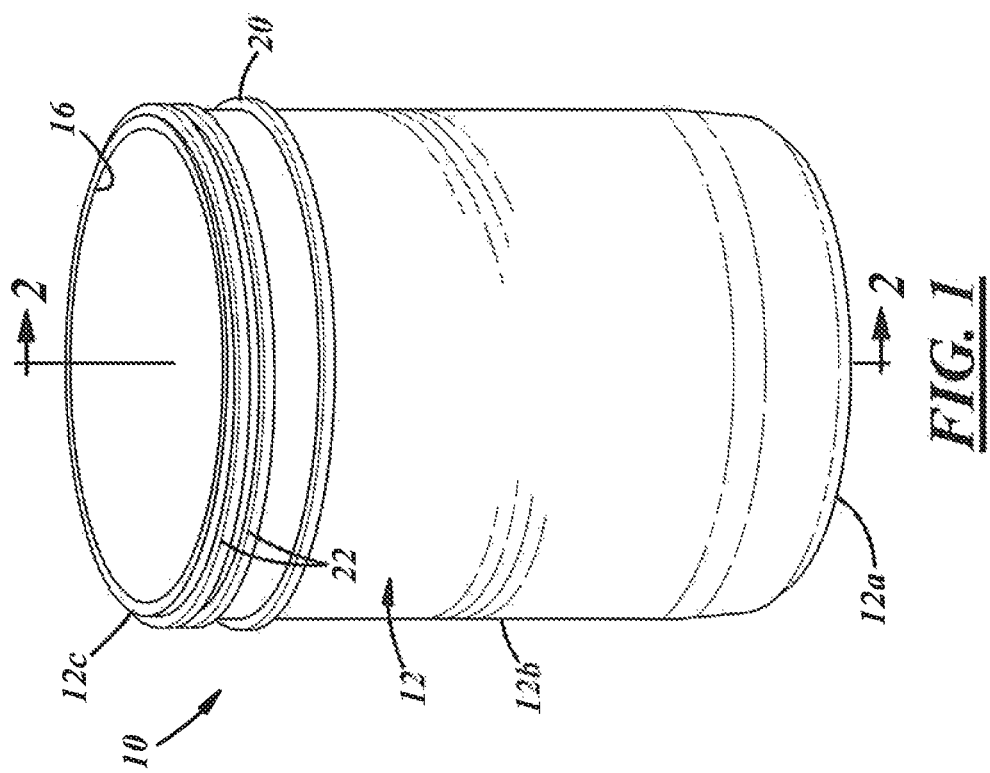
FIG. 1 is a perspective view of a glass-ceramic article in the form of a container according to one embodiment of the disclosure.

A glass-ceramic container 10 constructed as a jar is shown in FIGS. 1-2 as an example of a glass-ceramic article according to the present disclosure. The glass-ceramic container 10 includes a hollow main body 12 that includes a bottom wall 12a, an upstanding side wall 12b that extends upwards from a periphery of the bottom wall 12a along a central container axis 14, and a neck portion 12c that extends from the upstanding side wall 12b and defines an opening 16 to the container 10. The opening 16 provides access to an internal containment space 18 defined by the main body 12 for the storage of any of a wide variety of materials including various solids and liquids. The neck portion 12c may also include a neck finish having a neck bead 20 and at least one exterior surface feature 22 that enables a closure member (not shown) to be attached and secured to the container 10. The surface feature 22 shown here is a protruding helical thread disposed on and around the exterior surface of the neck portion 12c, but the feature can be of any other type which would allow the attachment of a closure.

The main body 12 is composed of a glass-ceramic material that has an amorphous residual glass phase and a crystalline phase distributed within the amorphous residual glass phase. The amorphous residual glass phase is a glass matrix that contains a disordered and spatially crosslinked ternary oxide network in much the same way as non-crystalline glass. The crystalline phase is comprised of combeite crystals, or $Na_2Ca_2Si_3O_9$, distributed homogeneously within the bulk of the amorphous residual glass phase. On a volume percent basis, the amorphous residual glass phase and the crystalline phase may constitute between 5% and 70% and between 30% and 95%, respectively, of the glass-ceramic material. And, in terms of its compositional make-up, the glass-ceramic material is based on the same primary oxides as conventional soda-lime-silica glass. Specifically, the glass-ceramic material has an overall composition that comprises $Na_2O$, $CaO$, and $SiO_2$ with a molar ratio of $Na_2O:CaO:SiO_2$ being 1:2:3. This higher sodium and calcium content promotes bulk crystallization of the combeite crystals, so that crystallization is easier to initiate and control during manufacture of the glass-ceramic material, compared to conventional soda-lime-silica glass, which has a molar ratio of $Na_2O:CaO:SiO_2$ that is approximately 1:1:6.

While the overall composition of the glass-ceramic material has a $Na_2O:CaO:SiO_2$ molar ratio of 1:2:3, the compositions of the amorphous residual glass phase and the crystalline phase, which together contribute to the overall composition, are not necessarily the same as each other and the overall composition in terms of their Na, Ca, and Si content. Indeed, the combeite that forms upon crystallization has a tendency to sequester a higher amount of $Na_2O$ in the crystal than stoichiometry would dictate. For example, in some embodiments, sodium cations are sequestered in the combeite, thus leading to the crystalline phase of the glass-ceramic material having a higher sodium content than the amorphous residual glass phase. In such circumstances, the sodium content in the crystalline phase may range from 12 at % to 16 at % while the sodium content in the amorphous residual glass phase may range 8 at % to 14 at %. In addition to the enhancements in strength, toughness, chemical durability, electrical resistance, and shock resistance that are attributed to presence of the crystalline phase generally, a sodium-enriched crystalline phase in the present glass-ceramic material can sequester ions that would otherwise leach out of the glass, thereby further enhancing chemical durability of the finished glass article.

The glass-ceramic container 10 is formed from a chemically-synthesized feedstock gel that is converted into the glass-ceramic container 10 at a temperature that does not exceed 900° C. The feedstock gel is a gelatinous material that includes a base oxide network component and an extending swelling agent entrapped within the base oxide network. The base oxide network comprises a homogeneous chemical mixture of $Na_2O$, $CaO$, and $SiO_2$ with a molar ratio of $Na_2O:CaO:SiO_2$ being 1:2:3 (i.e., $Na_2O$-$2CaO$-$3SiO_2$). The extending swelling agent is preferably water due to the hydroscopic nature of the base oxide network component and the ability of water to be physically and/or chemically entrained within the oxide network. The feedstock gel is light and has a high surface area. For instance, in a preferred embodiment, the feedstock gel has a density of less than 2.0 g/cm$^3$, preferably between about 1.0 g/cm$^3$ and about 1.5 g/cm$^3$, including all ranges, sub-ranges, and values therebetween, and a surface area of at least 10 m$^2$/g, preferably between 5 m$^2$/g and 50 m$^2$/g, including all ranges, sub-ranges, and values therebetween, as measured by nitrogen BET adsorption.

The base oxide network component of the feedstock gel may optionally include other material besides $Na_2O$, $CaO$, and $SiO_2$. Some examples of secondary materials that may also be homogeneously distributed within the base oxide network include colorants, decolorants, redox agents, or other agents that affect the physical and/or chemical properties the final glass-ceramic material of the glass-ceramic container 10. Specific colorants and decolorants that may be present include the elemental forms or oxide compound forms of one or more of selenium, chromium, manganese, iron, cobalt, nickel, copper, niobium, molybdenum, silver, cadmium, indium, tin, gold, cerium, praseodymium, neodymium, europium, gadolinium, erbium, and uranium. And specific materials that can affect the redox state and/or the physical properties of the glass-ceramic material include one or more of carbon (up to 3 mol %), nitrates (up to 3 mol %), selenium (up to 1 mol %), titanium oxide ($TiO_2$) (up to 5 mol %), arsenic oxide ($As_2O_3$) (up to 2 mol %), vanadium oxide ($V_2O_5$) (up to 5 mol %), fluorines (up to 2 mol %), chlorines (up to 2 mol %), and sulfates (up to 2 mol %). A few examples of commonly used oxidizers and reducers include calcium sulfate ($CaSO_4$), sodium nitrate ($NaNO_3$), potassium nitrate ($KNO_3$), iron pyrite ($FeS_2$), and graphite.

Figure 3:
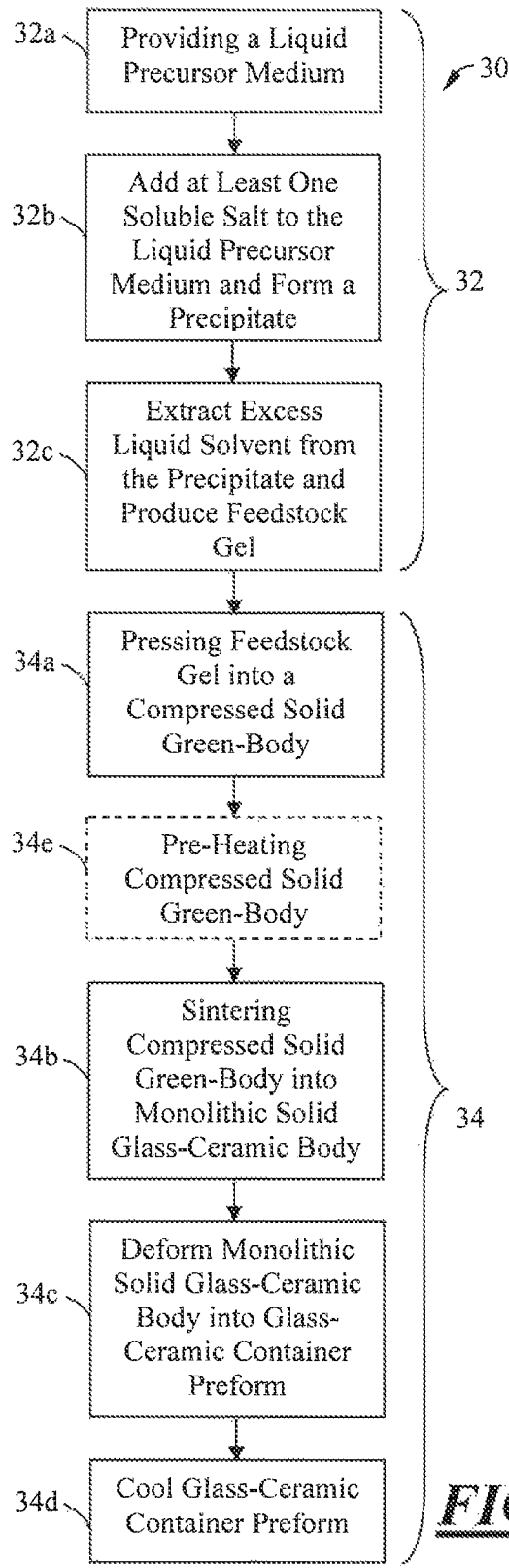
FIG. 3 is flowchart of a method of making the glass-ceramic container that generally includes a feedstock gel synthesis step and a feedstock gel conversion step.

Referring now to FIG. 3, a method 30 of making the glass-ceramic container 10 generally includes a feedstock gel synthesis step 32 and a feedstock gel conversion step 34. There are different ways for performing each of these steps 32, 34 including the various preferred techniques described below with respect to FIGS. 4-8. The entire process for forming the glass-ceramic container 10 can be performed relatively quickly at modest temperatures compared to a other manufacturing practices in which a glass melt obtained from heating a feedstock batch of virgin raw materials and optionally recycled glass at high temperatures for long periods of time (e.g., greater than 1200° C. for 24 hours or longer) is thermally conditioned and formed into a container by standard glass forming techniques, followed by heat-treating the container to induce the bulk internal nucleation and crystal growth needed to convert the glass container into a glass-ceramic. Thus, in practicing the disclosed method, less energy is consumed on a per container basis compared to processes that include some form of melt processing.

Figure 4:
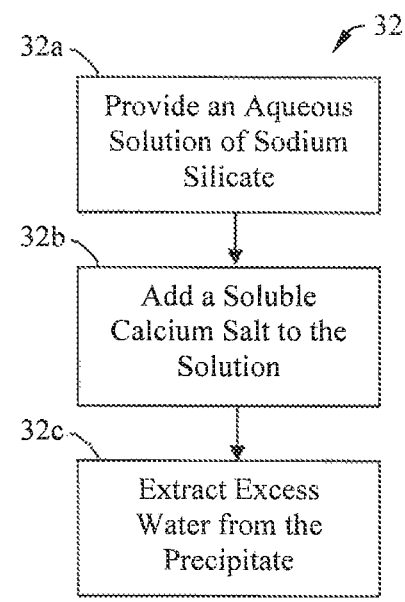
FIG. 4 is a flowchart of the feedstock gel synthesis step depicted in FIG. 3 according to one embodiment of the disclosure.
Figure 5:
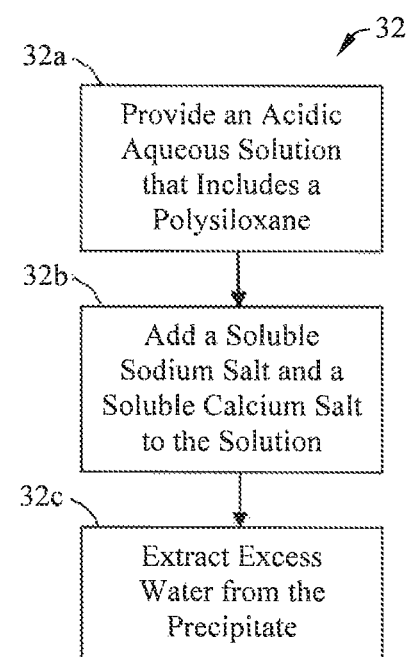
FIG. 5 is a flowchart of the feedstock gel synthesis step depicted in FIG. 3 according to another embodiment of the disclosure.

The feedstock gel synthesis step 32 involves chemically synthesizing the feedstock gel from a liquid precursor medium. In general, this step 32 involves providing the liquid precursor medium, in step 32a, which includes a reactive silicon-containing precursor compound dissolved or dispersed in a solvent. Next, in step 32b, at least one soluble salt is added to the liquid precursor medium and a precipitate is formed from the liquid precursor medium that comprises $Na_2O$, CaO, and $SiO_2$ in the 1:2:3 molar ratio of $Na_2O$:CaO:$SiO_2$ that is desired in the feedstock gel and ultimately the glass-ceramic material of the glass-ceramic container 10 or other article. The soluble salt added to the liquid precursor medium in step 32b is selected from a soluble sodium salt, a soluble calcium salt, or both a soluble sodium salt and a soluble calcium salt. Finally, in step 32c, excess liquid solvent is extracted from the precipitate to produce the feedstock gel. Several implementations of the feedstock gel synthesis step 32 using different reactive silicon-containing precursor compounds are depicted in FIGS. 4-5. Other procedures not specifically described here may of course be employed to chemically synthesize the feedstock gel.

Referring now specifically to FIG. 4, the feedstock gel synthesis step 32 may be carried out using a liquid precursor medium that includes sodium silicate as the reactive silicon-containing precursor compound. In this regard, the liquid precursor medium provided in step 32a may be an aqueous solution of sodium silicate, $Na_2O \cdot xSiO_{2(aq)}$, in which a molar ratio of $Na_2O$:$SiO_2$ (i.e, "x" in the chemical formula $Na_2O \cdot xSiO_{2(aq)}$) within the sodium silicate may range from 1 to 3.75, including all ranges and sub-ranges therebetween, with a preferred molar ratio of $Na_2O$:$SiO_2$ being one. The aqueous solution of sodium silicate is preferably, but not necessarily, concentrated in that it contains at least 5 wt % sodium silicate and, more preferably, between 25 wt % and 40 wt % sodium silicate, in order to mitigate the loss of $Na_2O$ and to help ensure that good ion exchange efficiency between $Ca^{2+}$ and $Na^+$ is realized in the following step (step 32b).

An aqueous solution of sodium silicate may be purchased commercially or, alternatively, it can be prepared, for example, by hydrothermally dissolving quartz sand in a caustic aqueous sodium-based solvent such as sodium hydroxide (NaOH) concentrated to greater than 10 wt % (of the sodium base) a temperature between 25° C. and 300° C. and a pressure between 10 atm to 100 atm for a period of 3 hours to 24 hours. And, regardless of whether the sodium silicate solution is purchased or prepared, an acid such as nitric acid ($HNO_3$) may be added to the solution to downwardly adjust the the molar ratio of $Na_2O$ to $SiO_2$, if desired, to a lower number by neutralizing some of the $Na_2O$ into silicic acid ($SiH_4O_4$) and sodium nitrate ($NaNO_3$). Any additional secondary materials that are desired in the feedstock gel may be added to the solution at this time either as a solid or dissolved in water.

After the aqueous solution of sodium silicate has been provided in step 32a, a soluble calcium salt is added to the solution in step 32b to form a precipitate having a molar ratio of $Na_2O$:CaO:$SiO_2$ that is 1:2:3, which is equal to the molar ratio $Na_2O$:CaO:$SiO_2$ desired in the base oxide network of the feedstock gel. The soluble calcium salt is preferably at least one of calcium nitrate ($Ca(NO_3)_2$) or calcium chloride ($CaCl_2$), although other calcium salts that can be a source of calcium cations may also be used. The introduction of the soluble calcium salt into the aqueous solution of sodium silicate reduces the $Na_2O$:$SiO_2$ molar ratio of the dissolved sodium silicate since sodium cations are readily displaced with calcium ions. Such an ion exchange mechanism introduces calcium oxide into the sodium silicate and causes the newly-modified silicate to precipitate out of solution. And since one mole of calcium ions (which results in a corresponding mole of CaO) displaces one mole of $Na_2O$ in the dissolved sodium silicate, as exhibited in the representative chemical equation below, the amount of the soluble calcium salt that needs to be added into solution to provide the precipitate with the 1:2:3 molar ratio of $Na_2O$:CaO:$SiO_2$ can be easily calculated based on the molar ratio of $Na_2O$:$SiO_2$ in the aqueous solution of sodium silicate originally provided in step 32a.

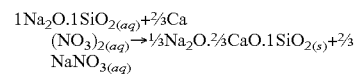

$$1Na_2O \cdot 1SiO_{2(aq)} + \tfrac{2}{3}Ca(NO_3)_{2(aq)} \rightarrow \tfrac{1}{3}Na_2O \cdot \tfrac{2}{3}CaO \cdot 1SiO_{2(s)} + \tfrac{2}{3}NaNO_{3(aq)}$$

Next, in step 32c, excess water is extracted from the precipitate to produce the feedstock gel. The extraction of excess, non-entrained water from the precipitate can be achieved by a number of techniques. For instance, water may first be separated from the precipitate through centrifugation, membrane osmosis, filter pressing, screw pressing, chemical separation, and/or mechanical compounding (e.g., squeezing). The remaining wet solids—which have been chemically synthesized in steps 32a and 32b to have the desired formulation of $Na_2O$, CaO, and $SiO_2$—may then be dried. Drying can be performed in a convection oven at moderate temperatures ranging, for example, from 100° C. to 250° C. for a period of 20 minutes to 120 minutes, or it can be performed in any other suitable manner at conditions sufficient to remove residual water from the recovered solids. Rinsing of the recovered solids between initial water separation and drying may optionally be performed to wash away any reactants and/or reaction byproducts. When the water has been satisfactorily removed, the feedstock gel remains, and at this point the gel is ready to be converted into the glass-ceramic container 10 or some other glass-ceramic article by way of the feedstock gel conversion step 34.

The feedstock gel synthesis step 32 may also be carried out, as depicted in FIG. 5, using a liquid precursor medium that includes a polysiloxane as the reactive silicon-containing precursor compound. In particular, the liquid precursor medium provided in step 32a may be an acidic aqueous solution that includes a polysiloxane. A polysiloxane is a polymer that includes a siloxane backbone comprised of oxygen-bridged silicon atoms (—O—Si—O—) as well as leaving groups bonded to the silicon atoms. A variety of repeating functional groups may be linked to the silicon atoms as the leaving groups. For example, in a preferred embodiment, the polysiloxane may be an alkoxysilanol. An alkoxysilanol is a polymer that includes a siloxane backbone and that further includes alkoxy (—OR) and hydroxyl (—OH) groups linked to the siloxane backbone. Each of the alkoxy and hydroxyl groups can be displaced by sodium and calcium cations under the acidic conditions of the aqueous solution while hydrolysis and polycondensation reactions are occurring.

An acidic aqueous solution that includes an alkoxysilanol may be prepared by providing an aqueous solution that includes an acid catalyst, such as a 0.1-1M nitric acid ($HNO_3$) solution, followed by adding a tetraalkoxysilane to the aqueous solution while agitating (e.g., stirring) the solution. Other acid catalysts such as acetic acid or hydrchloric acid may be used as well. The tetraalkoxysilane added to the acidic solution is preferably tetraethyl orthosilicate (TEOS), tetramethyl orthosilicate (TMOS), or a mixture thereof, although other tetraalkoxysilanes may certainly be used. Upon being added to the aqueous solution that includes an acid catalyst, the tetraalkoxysilane undergoes hydrolytic polycondensation in which alkoxy functional groups are first substituted with hydroxyl functional groups followed by condensation reactions to produce the siloxane backbone of the alkoxysilanol. When, for example, TEOS is added to the acidic solution, the alkoxysilanol may be an ethoxysilanol in the sense that ethoxy functional groups (—$OC_2H_5$) and hydroxyl functional groups are linked to the siloxane backbone. Similarly, when TMOS is added to the acidic solution, the alkoxysilanol may be a methoxysilanol in the sense that methoxy functional groups (—$OCH_3$) and hydroxyl functional groups are linked to the siloxane backbone.

After the aqueous solution that includes a polysiloxane, or more preferably an alkoxysilanol, has been provided in step 32a, a soluble sodium salt and a soluble calcium salt are added to the solution in step 32b to introduce sodium and calcium, respectively, into the alkoxysilanol. The soluble sodium salt is preferably at least one of sodium hydroxide (NaOH), sodium nitrate (Na($NO_3$)), or sodium chloride (NaCl), and the soluble calcium salt is preferably at least one of calcium nitrate (Ca($NO_3$)$_2$) or calcium chloride ($CaCl_2$), although other sodium and calcium salts that can be a source of sodium and calcium cations, respectively, may also be used. The soluble sodium and calcium salts are preferably added to the aqueous polysiloxane solution sequentially while agitating the solution; that is, all of the soluble sodium salt is added first and then all of the soluble calcium salt is added next, or vice versa. The addition of the soluble sodium and soluble calcium salts to the aqueous polysiloxane solution displaces the hydroxyl functional groups, causing precipitation that entraps $Na^+$ and $Ca^{2+}$ ions. The resultant precipitate includes $Na_2O$ and CaO in addition to $SiO_2$. The relative molar quantities of the soluble sodium and soluble calcium salts can be calculated and added to the aqueous polysiloxane solution to provide the precipitate with a molar ratio of $Na_2O$:CaO:$SiO_2$ that is 1:2:3, which is equal to the molar ratio of $Na_2O$:CaO:$SiO_2$ desired in the base oxide network of the feedstock gel.

The precipitate is eventually collected by halting agitation of the solution and allowing and/or assisting the precipitate and the supernate to separate over time at ambient conditions of atmospheric pressure and 20° C.-25° C. The precipitate has a molar ratio of $Na_2O$:CaO:$SiO_2$ that is 1:2:3. In that sense, the precipitate obtained here from the liquid precursor medium that includes a polysiloxane is essentially the same in terms of its chemical composition as the precipitate obtained from the liquid precursor medium that includes sodium silicate, with the exception that some byproducts and excess residual solvent contained in the precipitate may be different. Consequently, in light of these similarities, excess water may be extracted from the precipitate in this embodiment to produce the feedstock gel in step 32c in the same manner as described above—including the initial separation of water followed by drying along with optional rinsing of the recovered solids—in anticipation of the feedstock gel conversion step 34.

After being synthesized, the feedstock gel is converted into the glass-ceramic container 10, or some other glass-ceramic article, in the feedstock gel conversion step 34, which can be accomplished at a temperature that does not exceed 900° C. The feedstock gel conversion step 34 may include a pressing step 34a, a sintering step 34b, a deforming step 34c, and a cooling step 34d, as depicted in FIG. 3. The ability to convert the feedstock gel into the glass-ceramic container 10 at such temperatures by way of sintering and deformation, in combination with the fact that the feedstock gel is chemically synthesized, imparts good energy efficiency to the overall method 30 since the high temperatures and long heating times associated with conventional glass melt processing can be avoided. What is more, the need to manage the flow and distribution of a corrosive glass melt, and intermediate glass precursor melts, and to maintain equipment that can tolerate the relatively harsh environment that accompanies the handling of a glass melt are generally not implicated in the disclosed method 30.

Figure 6A:
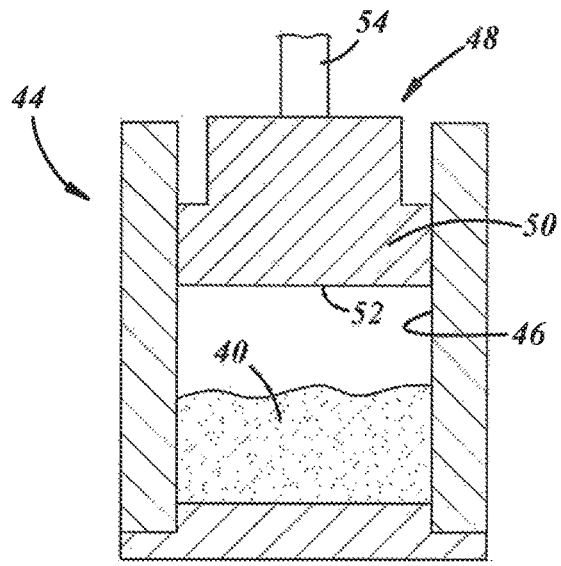
FIG. 6A is a side cross-sectional view of generic die pressing apparatus showing the feedstock gel loaded into a die cavity prior to being pressed by a retractable piston rod into a compressed solid green-body according to one embodiment of the disclosure.
Figure 6B:
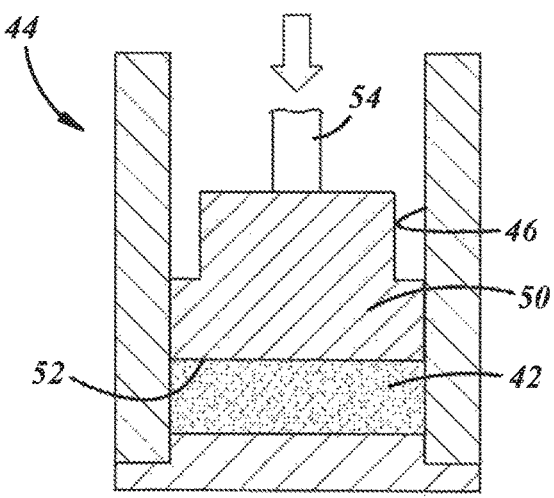
FIG. 6B is a side cross-sectional view of the generic die pressing apparatus showing the feedstock gel being pressed by the piston rod into the compressed solid green-body according to one embodiment of the disclosure.
Figure 6C:
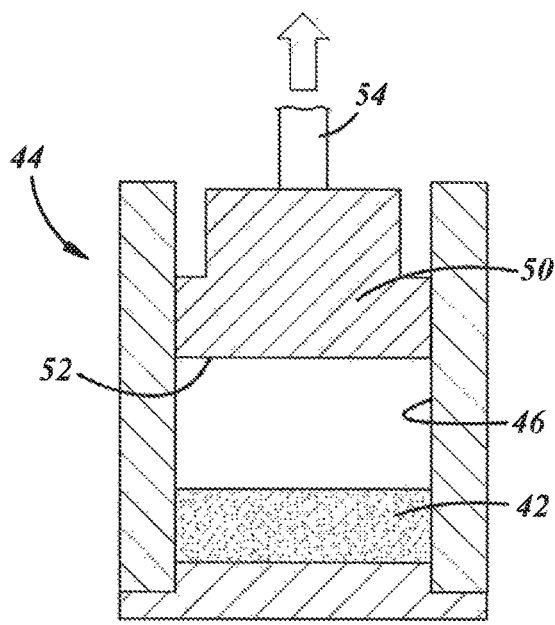
FIG. 6C is a side cross-sectional view of the generic die pressing apparatus showing the compressed solid green-body of the feedstock gel following retraction of the piston rod according to one embodiment of the disclosure.

The pressing step 34a is shown schematically in FIGS. 6A-6C and involves pressing the chemically-synthesized feedstock gel (identified here by reference numeral 40) into a compressed solid green-body 42 in a die-pressing apparatus 44. To begin, the feedstock gel 40 is loaded into in a die cavity 46 of the apparatus 44, as shown in FIG. 6A. The die cavity 46 here has a cylindrical cross-sectional shape. Once the feedstock gel 40 is in place, as shown in FIG. 6A, a retractable piston rod 48 having a piston head 50 is inserted into the die cavity 46 such that the piston head 50 slidingly mates with the side walls that define the die cavity 46. The retractable piston rod 48 is advanced within the die cavity 46 to bring a front surface 52 of the piston head 50 into pressed engagement with the feedstock gel 40. The piston head 50 is pressed against the feedstock gel 40 at an applied downward pressure of, preferably, 25 MPa to 100 MPa for a time of 30 seconds to 5 minutes using a hydraulic actuator 54. The compressive force applied by the piston head 50 compacts the feedstock gel 40 into the compressed solid green-body 42, as shown in FIG. 6B, where the gel material is held together in a weak, yet portable, physically consolidated disc-shaped mass. After the requisite compression has been achieved, the piston rod 48 is retracted to separate the front surface 52 of the piston head 50 from the compressed solid green-body 42, as shown in FIG. 6C, and the green-body 42 is removed from the die-pressing apparatus 44.

The compressed solid green-body 42 of the feedstock gel is then sintered into a solid monolithic body of a glass-ceramic material 56 (FIG. 7A) of approximately the same disc shape in the sintering step 34b. To produce the solid monolithic glass-ceramic body 56, the sintering process includes heating the compressed solid green-body 42 to fuse the green-body 42 together by way of a solid-state particle softening and diffusion mechanism without melting the gel to the point of liquification while at the same time inducing bulk crystallization of the fusing mass (i.e., sinter-crystallization). Crystallization of the sintered glass material can readily occur during the sintering step 34b because the composition of the base oxide network of the feedstock gel and, in particular, the molar ratio of $Na_2O:CaO:SiO_2$, allows for enough mobility of the molecular network chains at sintering temperatures that the chains can rearrange themselves into combeite crystal structures having repeating structural units. As such, the solid monolithic glass-ceramic body 56 that results from the sintering step 34b is unitary block of a heated glass-ceramic material that includes both the amorphous residual glass phase and the crystalline phase of combeite, as described above, although the final proportions of those two phases in volume percent may not yet be finally established. The solid monolithic glass-ceramic body 56 has a density that is greater than the density of the feedstock gel 40 due to the densification that occurs during the sintering step 34b.

The compressed solid green-body 42 of the feedstock gel may be sintered at a temperature between 600° C. and 900° C. and held at that temperature for a period of time to carry out the sintering step 34b. For example, in a preferred embodiment, the compressed solid green-body 42 may be heated until it reaches a sintering temperature between 600° C. to 900° C. or, more narrowly, between 680° C. to 750° C., at which point the green-body 42 (a term which includes any transition phase between the green-body 42 and solid monolithic glass-ceramic body 56) may be held at the sintering temperature for a period of 1 minute to 30 minutes. The sintering step 34b may be preceded by an optional preheating step 34e in order to burn off any binder material or solvent that may have been used to aid in the compaction and retention of the the green-body 42 of the feedstock gel, as well as other foreign contaminate matter that may be present. This optional preheating step 34e may involve initially heating the compressed solid green-body 42 to a burn-off temperature between 100° C. to 400° C. and holding the green-body 42 at that temperature for a period of 5 minutes to 60 minutes and, thereafter, continuing to heat the compressed solid green-body 40 up to the sintering temperature. The heating that typifies the sintering step 34b may be conducted in a belt-type furnace or oven, such as a lehr, to facilitate more efficient manufacturing cycle times, although other heating techniques and apparatuses may certainly be employed.

Figure 7A:
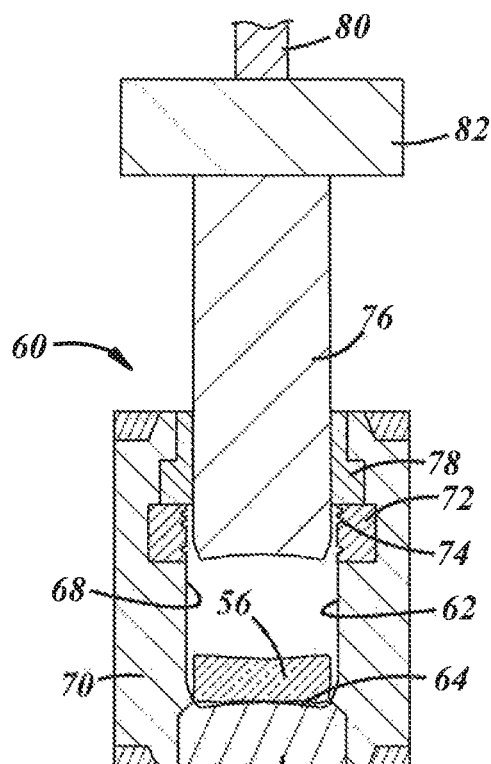
FIG. 7A is a side cross-sectional view of a generic hot-stamping apparatus showing the solid monolithic glass-ceramic body loaded into a mold cavity prior to being mechanically deformed by a retractable plunger into a glass-ceramic preform having a container shape according to one embodiment of the disclosure.

The solid monolithic glass-ceramic body 56 produced in the sintering step 34b is then deformed mechanically into a glass-ceramic preform (identified by reference numeral 58 (FIGS. 7B-7C)) in the deformation step 34c at a temperature of 680° C. or above. The mechanical deformation step 34c may include hot-pressing the solid monolithic glass-ceramic body 56 into the glass-ceramic preform 58 in a hot-stamping apparatus 60. In this regard, as shown in FIG. 7A, the solid monolithic glass-ceramic body 56 is transferred into a mold cavity 62 of the hot-stamping apparatus 60 while still at an elevated temperature at or above 680° C. as a result of being heated during the sintering step 34b. The mold cavity 62, as shown, may be defined by a convex surface 64 of a bottom plate 66 and an upstanding peripheral surface 68 of a side wall 70 that is affixed to and surrounds a circumference of the bottom plate 66. The side wall 70 may additionally be outfitted with a neck ring 72 having at least one intrusion 74 such as, for example, a continuous helical groove or other feature that can be used to attach a closure to the container. The neck ring 72 may be installed in the side wall 70 to provide the peripheral surface 68 with the profile needed to create a neck finish on the exterior of the neck portion 12c of the glass-ceramic container 10.

Figure 7B:
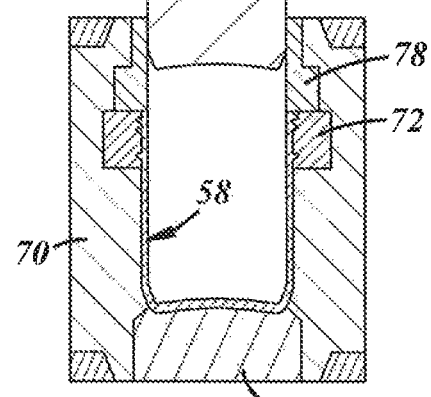
FIG. 7B is a side cross-sectional view of the generic hot-stamping apparatus showing the solid monolithic glass-ceramic body being mechanically deformed by the plunger into the glass-ceramic preform according to one embodiment of the disclosure.
Figure 7C:
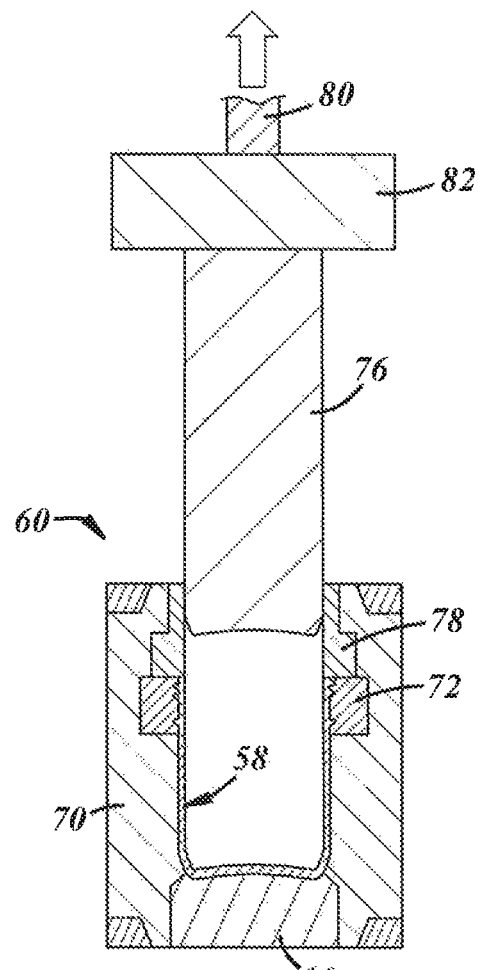
FIG. 7C is a side cross-sectional view of the generic hot-stamping apparatus showing the glass-ceramic preform following retraction of the plunger according to one embodiment of the disclosure.

Once the solid monolithic glass-ceramic body 56 is located in the mold cavity 62, a retractable plunger or mandrel 76 is inserted into the mold cavity 62 while being centrally guided by a guide ring 78 located adjacent to the opening of the mold cavity 62 within the side wall 70. The plunger 76 is advanced against the solid monolithic glass-ceramic body 56 within the mold cavity 62 to force the glass-ceramic body 56 to deform up and around the plunger 76 so as to occupy the available space between the plunger 76 and the upstanding peripheral surface 68 of the side wall 70, as shown in FIG. 7B. To accomplish such mechanical deformation at an acceptable deformation rate, the plunger 76 may apply a downward pressure against the solid monolithic glass-ceramic body 56 of, preferably, 5 MPa to 25 MPa for a time period of 3 seconds to 30 seconds while the bottom plate 66 and the side wall 70 of the hot-stamping apparatus 60 are maintained at a temperature between 600° C. and 750° C. The forcible downward pressure applied by the plunger 76 may be delivered by a hydraulic actuator 80 that acts on the plunger 76 through a ram extender 82. After the solid monolithic glass-ceramic body 56 has been deformed into the glass-ceramic preform 58, the plunger 76 is retracted, as shown in FIG. 7C, and the preform 58 is removed from the hot-stamping apparatus 60.

The glass-ceramic preform 58 is formed of the same glass-ceramic material as the solid monolithic glass-ceramic body 56 and has a container shape. The container shape of the glass-ceramic preform 58 may vary. For example, the container shape may resemble the shape of the final glass-ceramic container, such as the shape of the glass-ceramic container 10 shown in FIGS. 1-2, or it can resemble the shape of a partially-formed container such as a parison that ultimately needs to undergo additional processing, such as blowing, to be transformed into the final container shape. As such, and referring for the moment back to FIGS. 1-2 as a representative example, the "container shape" of the glass-ceramic preform 58 may resemble the size and shape of the hollow main body 12 or it may resemble the size and shape of a hollow yet partially-formed parison that can be later formed into the hollow main body 12, typically by expanding the parison with compressed air while the parison is at an elevated temperature similar to that used to mechanically deform the solid monolithic glass-ceramic body 56 into the glass-ceramic preform 58. If the container shape resembles a hollow yet partially-formed parison, the glass-ceramic article produced from the preform 58 upon cooling would, consequently, be a partially-formed container.

Figure 8:
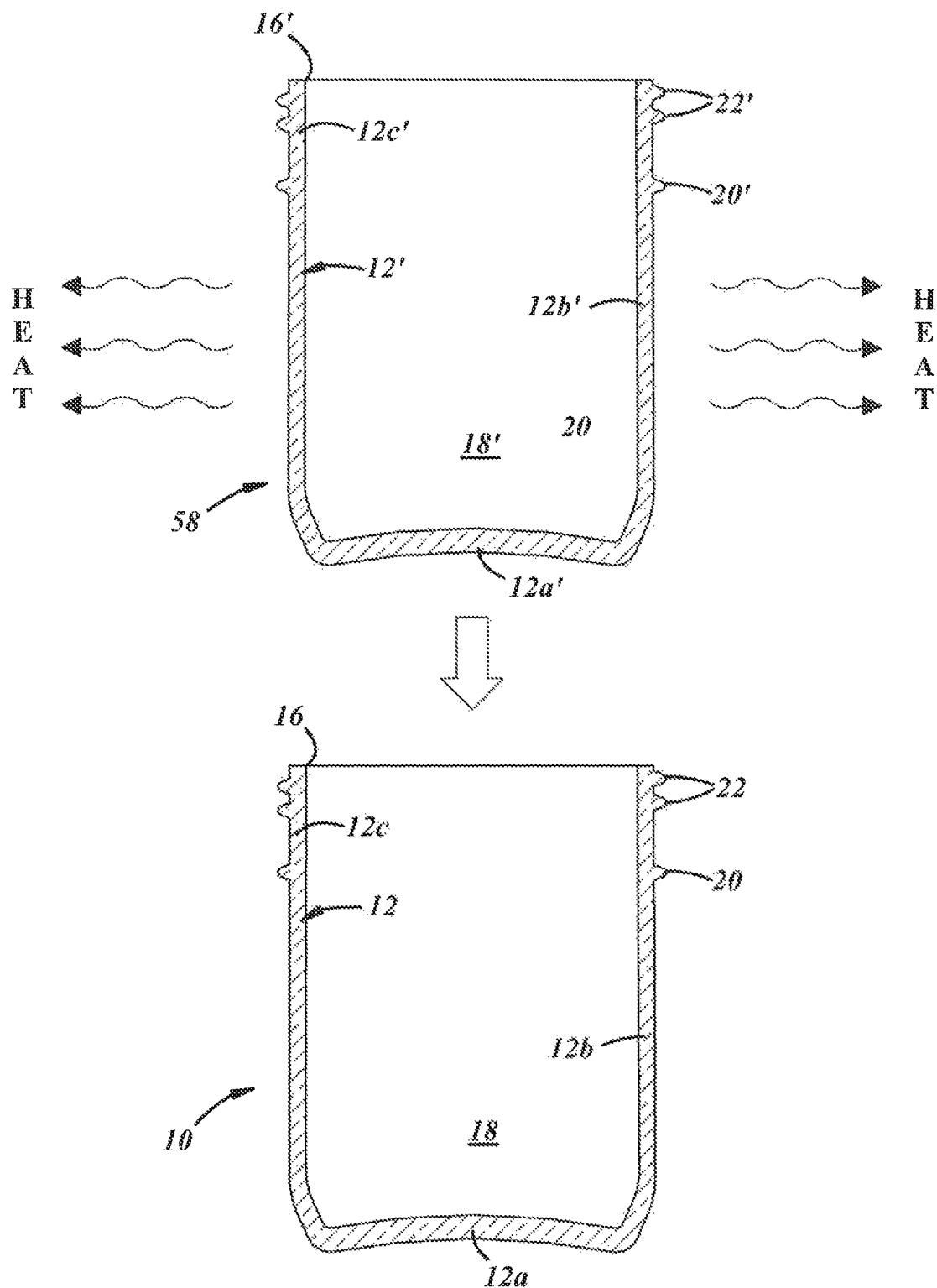
FIG. 8 a representative broken away perspective view of the glass-ceramic preform being cooled into a glass-ceramic article in the form of a glass-ceramic container according to practices of the method set forth in the present disclosure.

The glass-ceramic preform 58 is shown in FIG. 8 for illustrative purposes as representing the final shape of the glass-ceramic container 10 and, thus, has a hollow main body 12'. The hollow main body 12' includes a bottom wall 12a', an upstanding side wall 12b', and a neck portion 12c', and further defines an internal containment space 18' and an opening 16' to the internal containment space 18'. The exact shape and profile of the hollow main body 12' is dictated by the contours of the mold cavity 62 of the hot-stamping apparatus 60. Indeed, in the specific embodiment shown here in FIG. 8, the bottom wall 12a' is bowed into the internal containment space 18' in complimentary conformance to the convex surface 64 of a bottom plate 66, and the upstanding side wall 12b' extends upwardly from a periphery of the bottom wall 12a' to the neck portion 12c' in complimentary conformance to the upstanding peripheral surface 68 of the side wall 70 beneath the neck ring 72. The neck portion 12c' is the distal portion of the hollow main body 12' and defines the opening 16' to the internal containment space 18'. The neck portion 12c' may have a neck bead 20' and at least one exterior surface feature 22' that is shaped inversely to the at least one intrusion 74 contained in the neck ring 72. For example, the at least one exterior feature 22' of the neck portion 12c' may include a continuous protruding exterior helical thread.

The hollow main body 12' of the glass-ceramic preform 58 in this embodiment shown in FIG. 8 is thus a three-dimensional container-shaped monolithic structure of the glass-ceramic material whose temperature is still above 600° C., but not higher than 900° C., as a result of the deformation step 34c. The container shape assumed by the glass-ceramic preform 58 at this point is identical or nearly identical to the final shape and profile of the glass-ceramic container 10 except for some marginal thermal contraction that may occur during the cooling step 34d and which generally cannot be visually detected by human eyesight. Further crystallization may or may not continue to occur within the glass-ceramic material while the glass-ceramic preform 58 is at an elevated temperature state. The container shape of the glass-ceramic preform 58 may assume a wide variety of configurations associated with jars and bottles including, for example, beverage and food containers, and as explained above, may resemble the shape of the final container or a partially-formed container such as a parison.

The cooling step 34d is performed after the formation of the glass-ceramic preform 58. During the cooling step 34d, the glass-ceramic preform 58 is cooled from its elevated temperature into the glass-ceramic container 10 while retaining the previously-established container shape. The cooling of the glass-ceramic preform 58 into the glass-ceramic container 10 may involve cooling the preform 58 at a controllable rate of 5° C./min to 50° C./min until it reaches room temperature (i.e., 20° C.-25° C.), although other time-temperature cooling practices may be used. The resultant glass-ceramic container 10 has the chemical, electrical, optical, and mechanical properties typically associated with glass-ceramic materials as compared to conventional amorphous soda-lime-silica glass materials. For instance, and as most relevant to containers, the glass-ceramic container 10 exhibits good strength, toughness, and chemical durability, and also has the added benefit of a low coefficient of thermal expansion.

There thus has been disclosed a glass-ceramic container and a method of making a glass-ceramic container from a feedstock gel that satisfies one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A method of making a glass-ceramic article, the method comprising:
   synthesizing a feedstock gel that includes a base oxide network comprising $Na_2O$, $CaO$, and $SiO_2$ in which a molar ratio of $Na_2O:CaO:SiO_2$ is 1:2:3;
   pressing the feedstock gel into a compressed solid green-body;
   sintering the compressed solid green-body of the feedstock gel at a temperature below 900° C. to produce a solid monolithic body of a glass-ceramic material having an amorphous residual glass phase and a crystalline phase distributed within the amorphous residual glass phase, the solid monolithic body of a glass-ceramic material having a density that is greater than a density of the feedstock gel;
   deforming the solid monolithic body of a glass-ceramic material into a glass-ceramic preform having a container shape at a temperature of 600° C. or above; and
   cooling the glass-ceramic preform into a hollow glass-ceramic article that retains the container shape.

2. The method set forth in claim 1, wherein the step of synthesizing the feedstock gel comprises:
   providing an aqueous solution that includes sodium silicate having a $Na_2O:SiO_2$ molar ratio;
   adding a soluble calcium salt to the aqueous solution to form a precipitate having a $Na_2O:CaO:SiO_2$ molar ratio that corresponds to the molar ratio of $Na_2O:CaO:SiO_2$ in the base oxide network of the feedstock gel; and
   extracting liquid solvent from the precipitate to produce the feedstock gel.

3. The method set forth in claim 2, wherein the calcium salt comprises at least one of calcium nitrate or calcium chloride.

4. The method set forth in claim 1, wherein the step of synthesizing the feedstock gel comprises:
   providing an aqueous solution that includes an acid catalyst;
   adding a tetraalkoxysilane to the aqueous solution to form a polysiloxane through hydrolytic polycondensation of the tetraalkoxysilane;
   adding a soluble sodium salt and a soluble calcium salt to the aqueous solution to introduce sodium and calcium, respectively, into the polysiloxane;
   forming a precipitate that has a $Na_2O:CaO:SiO_2$ molar ratio that corresponds to the molar ratio of $Na_2O:CaO:SiO_2$ in the base oxide network of the feedstock gel; and
   extracting liquid solvent from the precipitate to produce the feedstock gel.

5. The method set forth in claim 4, wherein the tetraalkoxysilane is tetraethyl orthosilicate, tetramethyl orthosilicate, or a mixture thereof.

6. The method set forth in claim 4, wherein the acid catalyst is nitric acid, acetic acid, or hydrochloric acid.

7. The method set forth in claim 4, wherein the sodium salt comprises at least one of sodium hydroxide, sodium nitrate, or sodium chloride, and wherein the calcium salt comprises at least one of calcium nitrate or calcium chloride.

8. The method set forth in claim 1, wherein the step of sintering the feedstock gel into the solid monolithic body of a glass-ceramic material is performed at a temperature of 600° C. to 900° C.

9. The method set forth in claim 1, wherein the step of deforming the solid monolithic body of a glass-ceramic material into the glass-ceramic preform is performed at a temperature between 600° C. and 750° C.

10. The method set forth in claim 9, wherein the step of deforming the solid monolithic body of a glass-ceramic material into the glass-ceramic preform comprises hot-pressing the monolithic body of a glass-ceramic material in a mold cavity.

11. The method set forth in claim 1, wherein the glass-ceramic article is a container that comprises a hollow main body that defines an opening and an internal containment space accessible through the opening.

12. The method set forth in claim 1, wherein the glass-ceramic article is a glass-ceramic parison, and further comprising:
blowing the glass-ceramic parison to expand the parison into a glass-ceramic container comprised of a hollow main body that has a bottom wall, an upstanding side wall extending from a periphery of the bottom wall, and a neck portion extending from the side wall opposite the bottom wall and defining an opening to an internal containment space defined by the hollow main body.

13. A method of making a glass-ceramic article, the method comprising:
synthesizing a feedstock gel from a liquid precursor medium that includes a reactive silicon-containing precursor compound, the feedstock gel including a base oxide network comprising $Na_2O$, $CaO$, and $SiO_2$ in which a molar ratio of $Na_2O:CaO:SiO_2$ is 1:2:3;
pressing the feedstock gel into a compressed solid green-body;
sintering the compressed solid green-body of the feedstock gel at a temperature below 900° C. to produce a solid monolithic body of a glass-ceramic material having an amorphous residual glass phase and a crystalline phase distributed within the amorphous residual glass phase;
deforming the solid monolithic body of a glass-ceramic material into a glass-ceramic preform having a container shape at a temperature of 600° C. or above; and
cooling the glass-ceramic preform into a glass-ceramic container comprised of a hollow main body that has a bottom wall, an upstanding side wall extending from a periphery of the bottom wall, and a neck portion extending from the side wall opposite the bottom wall and defining an opening to an internal containment space defined by the hollow main body.

14. The method set forth in claim 13, wherein the liquid precursor medium is selected from an aqueous silicate solution that includes sodium silicate or an acidic aqueous solution that includes an alkoxysilane.

15. The method set forth in claim 13, wherein deforming the solid monolithic body of a glass-ceramic material comprises hot-pressing the solid monolithic body of a glass-ceramic material in a mold cavity at a temperature between 600° C. to 750° C. to form the glass-ceramic preform having a container shape.

16. A method of making a glass-ceramic article, the method comprising:
synthesizing a feedstock gel that includes a base oxide network comprising $Na_2O$, $CaO$, and $SiO_2$ in which a molar ratio of $Na_2O:CaO:SiO_2$ is 1:2:3, wherein synthesizing the feedstock gel comprises;
providing a liquid precursor medium that includes a reactive silicon-containing precursor compound selected from sodium silicate or a polysiloxane;
adding at least one soluble salt to the liquid precursor medium selected from a soluble sodium salt, a soluble calcium salt, or both a soluble sodium salt and a soluble calcium salt, wherein adding the at least one soluble salt causes a precipitate to form that includes $Na_2O$, $CaO$, and $SiO_2$ in which a molar ratio of $Na_2O:CaO:SiO_2$ in the precipitate is 1:2:3; and
extracting liquid solvent from the precipitate to produce the feedstock gel;
pressing the feedstock gel into a compressed solid green-body;
sintering the compressed solid green-body of the feedstock gel at a temperature below 900° C. to produce a solid monolithic body of a glass-ceramic material having an amorphous residual glass phase and a crystalline phase distributed within the amorphous residual glass phase;
deforming the solid monolithic body of a glass-ceramic material into a glass-ceramic preform having a container shape at a temperature of 600° C. or above; and
cooling the glass-ceramic preform into a glass-ceramic article in the form of a container or a parison.

17. The method set forth in claim 16, wherein deforming the solid monolithic body of a glass-ceramic material comprises hot-pressing the solid monolithic body of a glass-ceramic material in a mold cavity at a temperature between 600° C. and 750° C. to form the glass-ceramic preform having a container shape.

18. The method set forth in claim 16, wherein the glass-ceramic article is a glass-ceramic container comprised of a hollow main body that has a bottom wall, an upstanding side wall extending from a periphery of the bottom wall, and a neck portion extending from the side wall opposite the bottom wall and defining an opening to an internal containment space defined by the hollow main body.

19. A method of making a glass-ceramic article, the method comprising:
synthesizing a feedstock gel that includes a base oxide network comprising $Na_2O$, $CaO$, and $SiO_2$ in which a molar ratio of $Na_2O:CaO:SiO_2$ is 1:2:3;
pressing the feedstock gel into a compressed solid green-body;
sintering the compressed solid green-body of the feedstock gel at a temperature below 900° C. to produce a solid monolithic body of a glass-ceramic material having an amorphous residual glass phase and a crystalline phase distributed within the amorphous residual glass phase;
hot-pressing the solid monolithic body of a glass-ceramic material in a mold cavity at a temperature between 600° C. and 750° C. to form a glass-ceramic preform having a container shape; and
cooling the glass-ceramic preform into a hollow glass-ceramic article that retains the container shape.

20. The method set forth in claim 19, wherein the glass-ceramic article is a glass-ceramic container comprised of a hollow main body that has a bottom wall, an upstanding side wall extending from a periphery of the bottom wall, and a neck portion extending from the side wall opposite the bottom wall and defining an opening to an internal containment space defined by the hollow main body.

* * * * *